United States Patent
Johnson et al.

(10) Patent No.: US 6,174,472 B1
(45) Date of Patent: Jan. 16, 2001

(54) PROCESS FOR FORMING SOIL ENHANCING PELLETS

(76) Inventors: Ernest W. Johnson; Derek D. Nelson, both of P.O. Box 66, Frenchtown, MT (US) 59834-0066

(*) Notice: Under 35 U.S.C. 154(b), the term of this patent shall be extended for 0 days.

(21) Appl. No.: 09/145,939

(22) Filed: Sep. 3, 1998

(51) Int. Cl.$^7$ .............................. B29C 67/08; C05F 7/00; C05F 11/08

(52) U.S. Cl. .................... 264/118; 71/12; 71/14; 71/15

(58) Field of Search .............................. 71/9, 12, 14, 15, 71/23; 264/118, 109, 115; 435/290.1, 287.1

(56) References Cited

U.S. PATENT DOCUMENTS

| | | | |
|---|---|---|---|
| 1,810,802 | 6/1931 | Travers et al. | |
| 2,639,231 | 5/1953 | Snow, Jr. | 71/13 |
| 2,827,368 | 3/1958 | Mortensen et al. | 71/29 |
| 3,561,943 | 2/1971 | Gay, Jr. et al. | 71/9 |
| 3,793,841 * | 2/1974 | Dozsa | 264/117 |
| 4,161,825 | 7/1979 | Maffet | 34/12 |
| 4,214,985 | 7/1980 | Bodenrader | 210/11 |
| 4,710,219 | 12/1987 | Wahlberg | 71/11 |
| 4,721,585 | 1/1988 | Santolini et al. | 210/616 |
| 5,087,400 * | 2/1992 | Theuveny | 264/115 |
| 5,093,262 | 3/1992 | Yosiaki | 435/290 |
| 5,279,637 * | 1/1994 | Lynam et al. | 71/12 |
| 5,354,349 | 10/1994 | Inoue | 71/9 |
| 5,360,466 * | 11/1994 | Witmer et al. | 71/15 |
| 5,428,906 * | 7/1995 | Lynam et al. | 34/379 |
| 5,557,873 * | 9/1996 | Lynam et al. | 34/379 |

* cited by examiner

*Primary Examiner*—Angela Ortiz
(74) *Attorney, Agent, or Firm*—Keith S. Bergman

(57) ABSTRACT

The instant process forms a pellet comprised of at least sixty percent composted sewer sludge, up to forty percent cellulosic plant material and up to fifteen percent nutrient materials and chemicals for soil enhancement and plant nutrition that provides a combination of both long and short term beneficiation of soil and herbage and has no pathogenic microbes above regulatory ranges. The composted sewer sludge comprises primary sewer sludge admixed with cellulosic plant material that is thermally treated at temperatures between 140 and 180 degrees F. during composting to destroy mesophyllic pathogenic microbes and the viability of reproducible botanicals including seeds, but leave most thermophilic soil enhancing microbes in a viable state. Additional fibrous cellulosic material and chemicals are admixed with the composted sewer sludge and the mixture pelletized in a thermal process that raises pellet temperature to between 140 to 180 degrees F. The nutrient and chemical materials selectively comprise nitrogenous fertilizers, phosphate, potash, trace elements, herbicides, insecticides and botanical chemicals. The pellets may contain viable seeds desired for propagation.

8 Claims, No Drawings

PROCESS FOR FORMING SOIL ENHANCING PELLETS

RELATED APPLICATIONS

There are no applications related hereto heretofore filed in this or any foreign country.

BACKGROUND OF INVENTION

1. Field of Invention

This invention relates generally to pelletized soil enhancing material formed of 1) composted organic waste and sewer sludge, 2) fibrous cellulosic material and 3) herbal and soil enhancing chemicals.

2. Background and Description of Prior Art

The use of organic waste for soil enhancement and plant nutrition has long been known and practiced. The material was originally used largely in its native state, but through its historicity the use became more and more sophisticated until in the present day such materials are often quite highly processed before use to beneficiate them in various fashions and accelerate their reactions. This beneficiation often has provided quantities of nitrogenous materials, phosphates and potassium that are quickly released in soluble, plant assimilable form to such a degree that the sophisticated materials have in themselves become an environmental liability by overloading the soil with soluble plant nutrient materials sufficient to deleteriously change the entire ecosystem. The instant invention seeks to present a solution to this problem by providing such waste materials in a pelletized product that does not provide such a quick release of soluble products, but rather maintains the beneficial products in a less soluble form while providing means for soluble release at a slower rate over a longer period of time to allow assimilation of the materials by the soil and herbage therein to prevent deleterious environmental pollution, especially of the ground water.

Two general types of organic waste that have commonly been used for plant nutrition and soil enhancement, because of the availability of substantial amounts of such materials and the difficulty of their disposition in other fashions, are sewage sludge, especially that containing a substantial portion of animal excrement, and fibrous cellulosic waste, especially as derived from agricultural and arboreal wastes. In the past, each of these materials has tended to have been individually used, probably because of the particular and different processing requirements for each, but in distinction the instant product uses both materials in combination to provide synergistic benefits.

Fibrous cellulosic materials if used alone for soil beneficiation will tend to increase tilth, but at the expense of the available nitrogen content of the soil as nitrogen is required for microbal metabolic processes that cause degradation of the cellulosic material and this nitrogen must come from the available nitrogenous component of the surrounding soil. This problem has sometimes been addressed by acidifying the cellulosic material to encourage the development of humic acids to aid the cellulosic degradation process, but this solution generally has only shortened the degradation period and has not lessened the need for nor provided the nitrogenous material required for degradation. Nitrogen fixing microorganisims have been added to the cellulosic material, but this again has had substantially the same affect as acidification and largely has only exacerbated the problem without much, if any, acceleration of the process.

Another response to the problem of nitrogen depletion resulting from cellulosic degradation has been to provide additional nitrogenous material in the form of soluble nitrates, but this response has tended to provide an excess of soluble nitrates such that the nitrates are not assimilated and tend to leach into ground water to provide general environmental contamination. The instant product does not provide a substantial excess of soluble nitrogenous material nor does it abnormally acidify the cellulosic material, but rather it allows the decomposition process to proceed at a normal slower rate while providing means for supplying nitrogenous material and microbally generated humic acids as required over the disintegration period. The retention of the more natural process of forming humate maintains the plant nutrient material in humic acid molecules that are absorbed into associated organic colloids to form molecular clusters of humic acids and humic salts with the plant nutrients to provide a stable and efficient release of usable amounts of nutrients throughout the decomposition process.

Most sewer sludge, when removed from treatment facilities using common modern treatment processes, contains substantial quantities of viable microbes, principally of a bacterial nature, and often other viable biological material of a reproducible nature that may be deleterious to the environment, especially such as small seeds, plant parts, molds, yeasts and the like. In the early use of such material, it generally was applied upon land in its native state, either in a fluidic form or as a dried, particulate solid, with its viable biologic components still substantially in place.

As problems created by the viable biologic components came to be better realized, the sludge responsively was further processed to destroy the viability of some biologic components, generally by composting, oxidative aeration, thermal treatment, or combinations of these processes. This further processing has increased cost, however, and has been somewhat limited by reason of its economic viability. In general such further processing has not been designed to deal selectively or differentially with various of the biologically viable components in the sludge. The instant invention in contradistinction further processes sewer sludge in an economically viable manner by admixing it with cellulosic waste material and composting the mixture to institute humification that naturally destroys much or substantially all of the deleterious biological material while not affecting the viability of the beneficial soil microbes. The humification is only partially accomplished while maintaining soil nutrients in complex organic forms that are not readily soluble without further acidification by plant roots or further humification.

In general most pathologic bacteria are mesophyllic and are destroyed in a temperature range between 130 to 160 degrees F., while nonpathologic bacteria generally are thermophilic and will survive and retain viability in the mesophyllic range. Since the composting reaction is exothermal, the admixed sludge and cellulosic material are maintained for at least a portion of their composting period in the thermophilic range to destroy most, if not substantially all, of the pathogenic microbes. This composting process may be continued with sequential temperature changes for substantial periods of time to allow partial humification of the cellulosic material and this has the secondary benefit of destroying at least substantial portions, if not all, of any contained viable botanical and non-microbal material.

The resultant partially humified mixture is then admixed with additional cellulosic material and desired chemical additives and pelletized through a mill type die that has tapered openings which again provides an exothermal pelletizing process. This pelletizing process is regulated to attain temperatures in the pelletized product in the thermophilic range of approximately 180 degrees F. which, together with the pressures involved, tend to destroy any remaining pathogenic bacteria that might still be in the material, while yet creating a configurationally sustaining pellet of substantial durability that yet will properly disintegrate in use.

Pellets formed by the instant process continue the humification after placement and maintain portions of the nutrient materials in complex, organic molecules for timed release upon further acidification so as not to pollute the soil environment with an excess of readily soluble nutrient materials. The pellets also contain cellulosic material to provide soil humus, and provide enough nitrogen to further the humification process without removing substantial quantities of nitrogen from the surrounding soil environment. The pelletized material does not have significant levels of pathogenic microbes, but yet provides substantial quantities of viable soil bacteria to establish or reinforce the microbal population in the area of use to further aid future humification. The odors commonly associated with sewer sludge are not present in the pelletized product as those odors generally are created by mesophyllic bacteria which are not present.

Our invention resides not in any one of these features individually, but rather in the synergistic combination of all of its features that necessarily give rise to the product and process flowing therefrom.

SUMMARY OF INVENTION

Our invention provides a process for forming a pellet comprised of primary sewer sludge, cellulosic waste and chemical additives for soil and plant enhancement that contains viable soil enhancing microbes, but substantially no viable pathogenic bacteria.

Sewer sludge having substantial moisture content and admixed with cellulosic material of herbal and arboreal origin is composted in a mass over a period of from three to twelve months during which temperature of the mass is raised, at least during part of the period preferably sequentially, to a temperature of from 140 to 180 degrees F. The composted mass is then admixed with up to twenty-five percent of additional cellulosic material and chemical additives and pelletized under pressure in an exothermal process in which pellet temperatures of between 140 and 180 degrees F. are attained. The pelletized product is then cooled to not more than 100 degrees F. and packaged for use.

In creating such process and product, it is:

A primary object to provide a soil enhancing pellet formed of primary sewer sludge and cellulosic material that does not pollute the environment with excessive amounts of readily available soluble plant nutrients.

A further object is to provide such a pellet that retains viable thermophilic soil enhancing bacteria, but is substantially free of mesophyllic pathogenic bacteria above environmentally acceptable ranges.

A further object is to provide such a pellet wherein the cellulosic material has begun a humidification process and is partially humidified to maintain plant nutrient materials at least partially in large complex molecules of humic acid and its derivatives which are not readily soluble for release.

A further object is to provide a process for forming such a pellet wherein the pellet material is thermally treated at temperatures of between 140 to 180 degrees F. at at least two periods spaced in time to destroy mesophyllic pathogenic bacteria other microbes and viable botanical material without material destruction of the population of thermophilic soil bacteria in the pelletized material.

A still further object is to provide such raised temperatures in the material to be pelletized by thermally composting the sewer sludge with cellulosic material and by pelletizing the material under pressure in an exothermal process.

A still further object is to provide such a product and process that are new and novel, of simple and economic nature and otherwise well suited to the uses and purposes for which they are intended.

Other and further objects of our invention will appear from the following specification which forms a part hereof. In carrying out the objects of our invention, however, it is to be understood that its accidental features are susceptible to change in design and arrangement with only one preferred and practical embodiment of the best known mode being specified.

DESCRIPTION OF THE PREFERRED EMBODIMENT

Animal excreta and sewage disposal waste throughout their history have presented disposal problems and continue to do so in modern culture. Most of such material ultimately is recycled to the earth, but in general in its raw, originally collected state it is not suitable for direct earth application and notwithstanding the large volume of such material, additional processing is required to bring it to a suitable state for earth disposal. Commonly the microbal content must be modified, especially to remove or lessen the pathogenic moiety and deleterious chemicals and viable botanical materials must be modified or removed, especially in the case of animal excreta. Many and various processes for accomplishing these results have heretofore become known, but most such processes have dealt with particular products or have been directed toward particular ends and none seem to have presented a broad, general solution for the problems or have created an environmentally friendly, economically viable product that controls pathogens and other deleterious components and does not present environmentally contaminating amounts of soluble, immediately available plant nutrients.

The instant process in creating its product synergistically combines a plurality of processes that have been individually known, in essence at least, in the past, but have not heretofore been known in the particular synergistic combination specified and claimed to produce the instant product.

Processes heretofore used to control pathogenic microbes, and especially bacteria, have generally involved aerobic fermentation, acidification or thermal treatment of the sewage sludge. All three processes are documented in the general scientific and patent literature and generally are used in processes for present day sewage disposal. Proper processing parameters generally produce what have been accepted as tolerable results, though often over lengthy time periods and at unnecessary expense.

Primary sewer sludge commonly contains bacteria in the range of about ten to one hundred million per milliliter and these include coliform, *E.coli,* salmonella and various Gram negative bacteria. The efficiency of various secondary treatment plants is variable and cannot be relied upon to produce bacteriologically safe effluent or sludge. Members of the group of enteric sewage pathogens can and generally do survive secondary treatment and although their numbers are reduced, they are recoverable in a viable state from the treated product. These enteric bacteria may survive for months in the soil as the temperature, moisture and organic nutrients found there often actually stimulate their growth. Such survival period generally is longer than a crop growing season and such bacteria therefore can contaminate edible fruits and vegetables. To prevent a potential health hazard the direct use of raw sludge on the soil, without further processing, has been fairly strictly regulated and often prohibited by various health authorities.

Primary sewer sludge also contains variable but normally substantial amounts of nitrogen, phosphorous and potassium that each may range upwardly to more than two percent of the total mass of sludge. Most of these plant nutrient materials are found in soluble salts that may be readily leached from the sludge by normal environmental activity if the sludge is used for soil enhancement. These nutrient materials are in sufficient quantity that they usually cannot be completely used by resident plants and substantial unused portions of the nutrients find their way into the general soil environment where they tend to migrate to the ground water to there become an environmental pollutant that changes the ecosystem in which the nutrient materials reside. These problems also have become sufficient that various governmental authorities have commenced regulation of them to further restrict or prohibit the direct use of primary sewer sludge as a soil enhancer.

We provide a first primary treatment process for primary sewage sludge before pelletizing the sludge in a second final process to create a product for soil enhancement.

The primary treatment of raw sewer sludge comprises fermentative composting with carbon rich material comprising arboreal waste, herbal waste or both, which for convenience hereinafter is sometimes referred to as plant waste. To form the composting product, from twenty-five to seventy-five percent of raw primary sewer sludge is admixed with from seventy-five to twenty-five percent of plant waste, which preferably is arboreal waste from the lumber industry comprising wood scraps such as sawdust, shavings and bark material. Natural carbon rich cellulosic material is operative in the composting process and will beneficiate the raw sewage sludge for further use, but individual reactions and specific results of herbal material may differ somewhat from the same characteristics generated by arboreal material. The arboreal material will vary somewhat in the results it produces responsive to the relative amount of bark that it contains as that material tends to produce a more acidic fermentative process. The amount of bark or similar acidic plant material preferably is regulated to maintain a pH of the composting mass in the range of from about 6.2 to 7.5.

Raw primary sewage sludge normally is in a moist, semisolid form when removed from a primary or secondary processing source and generally remains substantially in this form until disposition. The plant waste component normally is in a particulate form upon acquisition. Either component for composting should be in a particulate form with no particles greater than about ½ inch in major dimension with at least 90 percent passing a ¼ inch screen. If the product is not in this form, it is mechanically particulated to bring the component to this stated standard, as composting is not practical, at least within a reasonable time period, for materials that are above the size range indicated. After particulation, if required, the component products are admixed to form a homogeneous mixture. Such admixture may be accomplished by known methods in machines presently used for such purposes in the material processing arts.

The moisture content of the admixed composting material is adjusted preferably to an optimum of fifty to sixty percent moisture, but not less than forty percent nor more than sixty-five percent moisture. Normally the raw sewage component will have a moisture content in the required range when mixed with the cellulosic plant waste component but if not the moisture may have to be adjusted to attain the specified range. The moisture content is essential for maintaining efficient degradation and humidification during the composting process. If the moisture is excessive, it inhibits aerobic metabolism of the resident microbal community by limiting oxygen diffusion and if it is deficient, the microbal growth rate is retarded.

For processing, the composting mixture is maintained in a bulk mass so that a substantial portion of the heat generated by the exothermal composting activity is maintained in the composting material to raise the temperatures of that material appropriately during the process. This heat maintenance may be accomplished merely by piling the composting material in a mass on a supporting surface in various configurations or by partially or totally containing the composting mixture, as may be required, to regulate temperature to the range that is essential to the process. The temperature of the composting material must be reasonably uniform throughout its mass and depending upon the configuration of the mass, this may require the admixture of various portions of the mass during the composting period.

Temperatures for effective composting are from one hundred forty to one hundred eighty degrees F. and the preferred temperatures are between one hundred forty-five to one hundred sixty degrees F. Most pathogenic bacteria, and microbes, especially those of the enteric type, are mesophyllic and generally are destroyed at temperatures above one hundred forty-five degrees F., though many, if not most, are destroyed at temperatures above about one hundred twenty degrees F. if exposed to such temperatures for a sufficient period of time. Most soil bacteria are thermophilic and their viability is normally not severely lessened at temperatures of one hundred eighty degrees F., though ideally the population is better sustained at temperatures not above one hundred sixty degrees F. The thermodynamics of composting at the temperatures indicated will tend to destroy or substantially lessen the population of pathogenic microbes, while at the same time maintaining or increasing the population of non-pathogenic microbes and especially such organisms that are commonly resident in soils.

The time for processing the composting mixture should be at least eight weeks and may extend to twelve months, but beyond that time the nature of the composted product varies significantly and further processing will not beget further benefits and may harm the product for further processing. Preferably the composting period extends between six to nine months. During an eight week composting period the specified temperatures should be maintained for approximately one-half of the period. For processing times longer than eight weeks, the specified temperature ranges preferably will be maintained cyclically with temperatures in the higher portion of the range interspersed with temperatures in the lower portion and such cycles preferably will have a periodicity of approximately eight weeks. This cyclical type of thermal processing tends to maximize the destruction of pathogens and also tends to destroy seeds and viable plant portions that may be in the composting material, such as when a portion of the material is derived from unprocessed animal manures or herbal matter containing viable reproducible portions. The moist thermal conditions of the composting mixture generally will cause germination of seeds or growth of reproducible plant portions, and the surrounding thermal environment and lack of light will destroy the germinated or developing material during a sensitive period by preventing their production of sugars.

During the composting process humification of the composting material will begin as the composting material has a resident population of humifying micro-organisms and the processing conditions provide an environment for propagation and development of such microbes to allow them to perform their normal humifying functions. If the population of humifying microbes is deficient in either types or amounts, additional microbes of required types may be infused, especially at the beginning of the composting period by infusing the material with previously composted material or cultures that have an appropriate resident microbal population. As the humification process proceeds with the carbon rich cellulosic material, humic acids will be formed that tend to create large complex organic molecules which embody portions of the readily soluble plant nutritional materials and maintain these materials in a less soluble state for dispersement over a longer period of time, generally responsive to further humidification and the presence of acid secretions of plant roots. This action tends to maintain substantial portions of the contained nitrogen, potassium and phosphorous in organic molecular complexes for a slower release over a longer period of time to prevent undesirable environmental pollution such as has occurred in the past with the more soluble forms of such materials.

Though the natures of primary sewer sludge and plant material both vary widely, the composting action of the combined material remains substantially the same for the essential processes and products described. A chemical analysis and biological assay of three typical samples of composted municipal sewer sludge is set forth in Table 1.

TABLE I

| | Parts per Million | | |
|---|---|---|---|
| Component | Sample 1 | Sample 2 | Sample 3 |
| CHEMICAL CONSTITUENTS | | | |
| Nitrates | 750 | 1500 | 750 |
| Nitrites | 0 | 0 | 0 |
| Nitrogen | 9 | 12 | 15 |
| $NH_4$ (ammonium) | 12 | 15 | 20 |
| $NH_3$ (ammonia) | 11 | 14 | 18 |
| Sulfides | 0 | 0 | 0 |
| Arsenic | <4.0 | <4.0 | <4.0 |
| Cadmium | 0.34 | 0.31 | <0.24 |
| Chromium | 1.4 | 1.5 | 1.6 |
| Copper | 34.5 | 30.0 | 27.4 |
| Mercury Solids | 0.3 | 0.6 | 0.5 |
| Molybdenum | <0.8 | <0.8 | <0.8 |
| Nickel | <1.7 | <1.7 | <1.7 |
| Lead | 14.7 | 18.5 | 17.4 |
| Selenium | <4.0 | <4.0 | <4.0 |
| Zinc | 129 | 124 | 116 |
| BIOLOGICAL CONSTITUENTS | | | |
| Aerobic Plate Count, per gram | 1 Mil | 5 mil | 30 Mil |
| Coliform | Neg | 5 | 4 |
| E. coli | Neg | Neg | Neg |
| Salmonella | Neg | Neg | Neg |
| Seeds Germinated | 90% | 90% | 90% |
| MICROBE ISOLATE by Rank | | | |
| Bacillus cerens | 1 | 1 | 2 |
| Arthrobacter globiformis | 2 | 2 | |
| Micrococcus variens | 3 | | |
| Brevibacterium caseli | 4 | 5 | |
| Corynebacterium lutem | 5 | | |
| Bacilius macerans | | 3 | 1 |
| Bacilius megaterium | | | 3 |
| Pseudomonis putida | | | 4 |
| Cellulomonius flavigera | | | 5 |
| Micrococcus kristimate | | | 6 |
| Erwinnia carotonova | | | 7 |
| Sphingobacterium spirtiovoreas | | | 9 |
| Aneyelobacterium | | | 8 |
| Bacillus Subtilis | | 4 | |

The foregoing samples were composted for a period of nine months, with five cyclic temperature changes of the composting mass to a high temperature of one hundred sixty degrees F. Physically the resultant material would pass a one inch screen, left less than 0.7 percent on a one-half inch screen and 90 percent would pass a one-quarter inch screen. At a moisture content of approximately sixty percent, the bulk density of the material was nine hundred eight pounds per cubic yard. Approximately eighty-nine percent of the material was of organic nature. All of the heavy metal tests and bacterial assays were well within present regulatory standards of the Environmental Protection Agency required for use of the composted product as an agricultural soil enhancer. The total nitrogen in such material averaged substantially two percent, the total phosphorous substantially one percent and the total potassium approximately 0.75 percent.

For final processing by thermal pelletization, a soil enhancement product is formed from sewer sludge composted by the primary composting process described, additional carbon rich cellulosic plant material and desired chemical additives. The composition of this product is set forth in Table II.

TABLE II

| Composition of Pelletizable Material | |
|---|---|
| Percentage | Material |
| at least 60 | composted primary sewer sludge and cellulosic plant material |
| 0 to 40 | cellulosic plant material |
| 0 to 15 | chemical additives for herbal for herbal and soil beneficiation |

The composted sewer sludge component formed according to the previously described process provides a moist, particulated material with a moisture content of approximately sixty percent and preferably is used in this state for further processing. The material has no disagreeable sewage-like odors and generally smells like fresh, newly exposed, moist soil. The undesirable odors often associated with sewer sludge and its products normally are caused by mesophyllic bacteria fermenting proteins contained in the sludge, but since those mesophyllic bacteria have largely been removed from the composted sludge, there is not a sufficient population remaining to produce the undesirable odors. Additionally much of the protein material has been modified in the composting process so that it is not available in a form for the production of undesirable odors.

The cellulosic component comprises plant waste of either arboreal or herbal origin. Such waste is particulated by ordinary machinery heretofore known for such purposes, if necessary, so that the major dimension of any particles will not be substantially greater than the major cross-sectional dimension of pellets that are to be formed therefrom. Preferably all of the particulated material will pass a one-half inch screen and less than one percent will not pass a ⅜ inch screen for the formation of pellets of one-quarter inch diameter.

The cellulosic material of arboreal origin preferably is scrap from the lumber industry, such as wood chips, sawdust and bark material. Cellulosic material of herbal original preferably is lawn and garden waste and straw and plant waste from agricultural operations.

The chemical additives component comprises known materials for beneficiating soil or plants in it, including but not limited to various nitrogenous fertilizers, phosphate salts, potash and trace elements. The chemical additives also may include herbicides, insecticides, other pesticides, plant hormones and enzymes, micro and seeds.

All components are admixed to a homogeneous mass. The moisture content of the material is adjusted to between ten to forty percent by weight, and preferably between approximately twelve to twenty percent, to allow proper pelletizing of the product. The moisture adjustment in the product is accomplished by drying or water injection as required with additional admixture and storage time if necessary to stabilize the moisture content homogeneously throughout the product mass.

The mass then is pelletized in a pellet mill by forcing it through a die under pressure pursuant to known processes using known machines. The pellets generally may not be well formed or stable if they are of a size having a major cross-sectional dimension that is greater than one-half inch. To maintain required configurational integrity the material preferably is pelletized by a die having tapered one-quarter inch diameter circular holes of a length of from approximately one-half inch to three inches. The pellets may be cut to particular desired lengths as extruded, but preferably are allowed to break randomly to provide a pelletized product averaging between one-quarter to one-half in length.

During the final pelletizing process the temperature of the processed material is raised to a range of between one hundred thirty to one hundred eighty degrees F. and preferably to a temperature of above one hundred forty-five degrees F. This temperature of the processed material normally is accomplished by the processing itself as the mixing of the processed material results in shearing and frictional contact of particles of the material which generate some heat and the pressure that the material is subjected to in the pelletizing die generates additional heat to provide an exothermal process. Heat generated in the normal pelletizing process through a one-fourth to one-half inch die normally is sufficient to generate the required temperatures in the pelletized product, but if not the temperature of the pellet forming process may be regulated by supplementary heating or cooling by known thermal processing apparatus. The temperature generally may be and preferably is regulated by regulating the temperature of the pelletizing die itself. The pellet temperature may also be regulated by regulating the configurational parameters of the die openings including diametrical size, length and taper as heretofore known.

After pelletization the product must be cooled to a temperature of not more than approximately one hundred degrees F. before packaging for the pellets to maintain their configurational integrity. If the product is not cooled for packaging and storage, pellets tend to become softer and more friable and the average pellet size will become less, if in fact the pellet configuration is maintained.

It is to be noted that pellets formed by the instant process have significant amounts of carbon rich cellulosic material, some of which is in a state of partial humification, and will have commenced the establishment of complex organic molecules that tend to capture plant nutrient materials and maintain them in a less soluble state than those materials were originally in as soluble salts in sewer sludge.

It is further to be noted that the pellets will continue to have a viable population of thermophilic microbes, at least a portion of which are involved in humification of cellulosic materials to continue or establish the humidification process in the pelletized material and in the soil environment in which that material comes to be resident, while at the same time much of the pathogenic microbe population has been destroyed to bring the pellets to levels below governmental regulatory standards for sewage derived materials for soil application.

The foregoing description of our invention is necessarily of a detailed nature so that a specific embodiment of it might be set forth as required, but it is to be understood that various modifications, rearrangements and multiplication of accidental features and detail might be resorted to without departing from its spirit, essence or scope.

Having thusly described our invention, what we desire to protect by Letters Patent, and

What we claim is:

1. A process for the formation of soil enhancing pellets from organic material including primary sewer sludge, comprising:

| forming a homogeneous mixture of | |
|---|---|
| at least 60 percent | composted sewer sludge, |
| 0 to 40 percent | cellulosic plant material and |
| 0 to 15 percent | soil and plant beneficiating chemicals; | composting the mixture for a period of at least eight weeks at atmospheric pressure in an aerobic environment while raising the temperature of the composting mixture, by regulating heat retained from the composting process at least once to between one hundred thirty to one hundred eighty degrees Fahrenheit to destroy mesophyllic bacteria and enhance growth of thermophyllic bacteria contained therein;

particulating said mixture to pass a one-half inch screen with at least ninety-nine percent passing a three-eighths inch screen; and pelletizing the mixture under pressure in a pellet mill in a process that raises the temperature of the mixture to between one hundred thirty and one hundred eighty degrees Fahrenheit to destroy mesophyllic bacteria in the mixture.

2. The process of claim 1 further including the step of:

maintaining the moisture content of the mixture between ten to forty percent by weight for pelletization.

3. The process of claim 1 further including the step of:

cooling the pelletized mixture to a temperature below one hundred degrees F. after pelletizing and before any subsequent complete containment.

4. The process of claim 1 wherein the composted sewer sludge is formed by:

admixing primary sewer sludge with from one to two times its weight of particulated cellulosic plant material, and composting the admixed primary sewer sludge and cellulosic material for a period of at least eight weeks during which the temperature of the composting material is raised at least once to between one hundred thirty to one hundred eighty degrees F.

5. The process of claim 1 wherein the cellulosic plant material comprises arboreal waste.

6. The process of claim 1 wherein the cellulosic plant material comprises herbal waste.

7. The process of forming soil beneficiating pellets from material including raw sewer sludge, comprising:

forming composted sewer sludge by admixing primary sewer sludge with one to two times its weight of particulated cellulosic plant material, adjusting the moisture content of the admixed primary sewer sludge and cellulosic plant material to between forty to sixty percent by weight and composting the mixture for a period of at least eight weeks while raising the temperature of the composting product at least once to between one hundred thirty and one hundred eighty degrees F.;

| forming a mixture of | |
| --- | --- |
| at least 60 percent | composted sewer sludge, |
| 25 to 40 percent | cellulosic plant material, and |
| 0 to 15 percent | soil and plant beneficiating chemicals; | particulating the mixture so that it passes a ½ inch screen and at least ninety-nine percent passes a ⅜ inch screen;

pelletizing the mixture in a pellet mill while maintaining temperature of the mixture at between one hundred thirty and one hundred eighty degrees F.;

cooling the pelletized mixture to a temperature below one hundred degrees F. after pelletizing.

8. The process of claim 1 further including:

the cellulosic plant material containing tree bark, and the pH of the mixture during composting being maintained between 6.2 to 7.5 by regulation of the proportion of bark in the mixture.

\* \* \* \* \*